US012168358B2

(12) United States Patent
Tani et al.

(10) Patent No.: US 12,168,358 B2
(45) Date of Patent: Dec. 17, 2024

(54) RECORDING APPARATUS

(71) Applicant: CANON KABUSHIKI KAISHA, Tokyo (JP)

(72) Inventors: Yuka Tani, Tokyo (JP); Toshiaki Tokisawa, Tokyo (JP); Soma Nakai, Tokyo (JP); Keisuke Arita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 18/058,414

(22) Filed: Nov. 23, 2022

(65) Prior Publication Data

US 2023/0166531 A1 Jun. 1, 2023

(30) Foreign Application Priority Data

Nov. 29, 2021 (JP) ................................ 2021-193682

(51) Int. Cl.
*B41J 3/407* (2006.01)

(52) U.S. Cl.
CPC ................................ *B41J 3/40731* (2020.08)

(58) Field of Classification Search
CPC .... B41J 3/40731; B41J 3/4078; B41J 3/4073; B41J 3/40733; B41J 11/0045; B41J 11/005; B41J 13/025; B41J 13/10; B41J 13/103; B41J 13/106; B41J 13/14; B41J 13/16
See application file for complete search history.

(56) References Cited

U.S. PATENT DOCUMENTS

2012/0147113 A1* 6/2012 Yamasaki ................ B41J 3/407
347/104

FOREIGN PATENT DOCUMENTS

| | | | |
|---|---|---|---|
| JP | 2012135600 | A | 7/2012 |
| JP | 2016150092 | A | 8/2016 |
| JP | 2020093142 | A | 6/2020 |
| JP | 2020168432 | A | 10/2020 |

* cited by examiner

*Primary Examiner* — Scott A Richmond
(74) *Attorney, Agent, or Firm* — Canon U.S.A., Inc. IP Division

(57) ABSTRACT

A recording apparatus includes a recording unit configured to perform recording on a recording medium placed at a first position, a placement unit configured to place the recording medium on the placement unit, and a pressing member configured to apply a pressing force to the recording medium placed on the placement unit toward the placement unit in a case where the recording medium is at the first position, and to release the pressing force in a case where the recording medium moves from the first position.

13 Claims, 9 Drawing Sheets

RECORDING APPARATUS

BACKGROUND

Field of the Disclosure

The present disclosure relates to a recording apparatus.

Description of the Related Art

In recording apparatuses for performing printing operation, a nail-art recording apparatus that performs printing using a user's nail as a recording medium is known. In such the nail-art recording apparatus, if the position of the nail moves while printing, the design may be damaged. For this reason, the position of the user's fingertip needs to be fixed. Japanese Patent Application Laid-open No. 2016-150092 discusses a configuration to determine the position of the nail by nipping the fingertip by using a fingertip pressing member that is pressed by a compression coil spring via a knock mechanism portion, and a fingertip constraint member to fix the position of the nail.

However, with the configuration discussed in Japanese Patent Application Laid-open No. 2016-150092, the fingertip pressing member needs to be pressed down to release the constraint of the nipped fingertip. Thus, the user cannot draw out the user's fingertip easily. For this reason, in a case where a user desires to pull out the user's finger from the recording apparatus promptly, the user cannot pull out the user's finger smoothly. Thus, the user's convenience is may be low.

SUMMARY

The present disclosure is directed to a recording apparatus capable of pulling out a recording medium from a recording apparatus smoothly.

According to an aspect of the present disclosure, a recording apparatus includes a recording unit configured to perform recording on a recording medium placed at a first position, a placement unit configured to place the recording medium on the placement unit, and a pressing member configured to apply a pressing force to the recording medium placed on the placement unit toward the placement unit in a case where the recording medium is at the first position, and to release the pressing force in a case where the recording medium moves from the first position.

Further features of the present disclosure will become apparent from the following description of embodiments with reference to the attached drawings.

DESCRIPTION OF THE EMBODIMENTS

<Nail Recording Apparatus>

A recording apparatus according to a first embodiment is a nail recording apparatus for recording a nail design on a nail. In the present embodiment, a description is given assuming that a user of the nail recording apparatus is also a recorded user who records the nail design on the recorded user's nail. However, the user of the nail recording apparatus and the recorded user may be different from each other.

Figure 1:
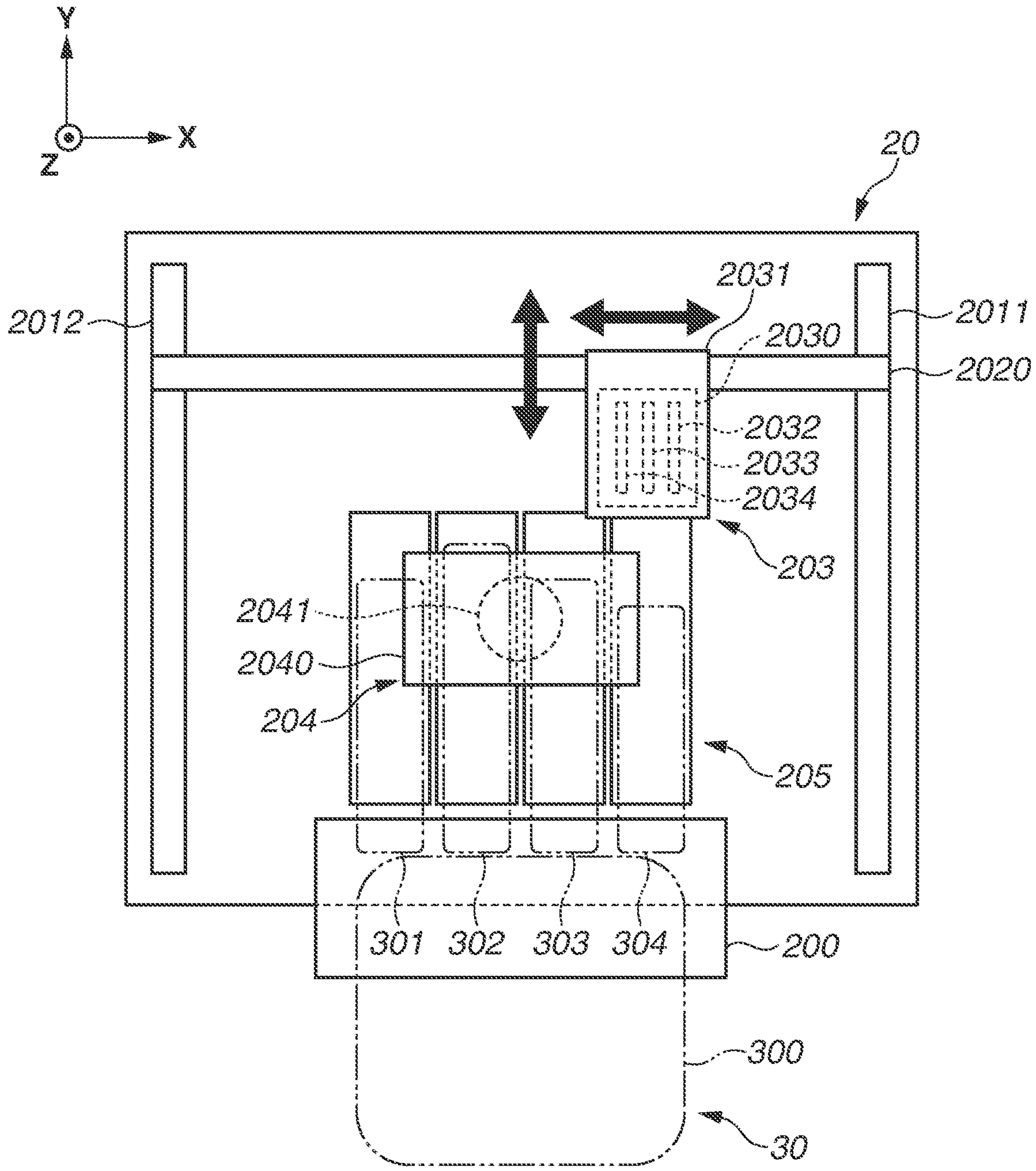
FIG. 1 is a top view schematically illustrating a configuration of a recording apparatus according to a first embodiment.
Figure 2:
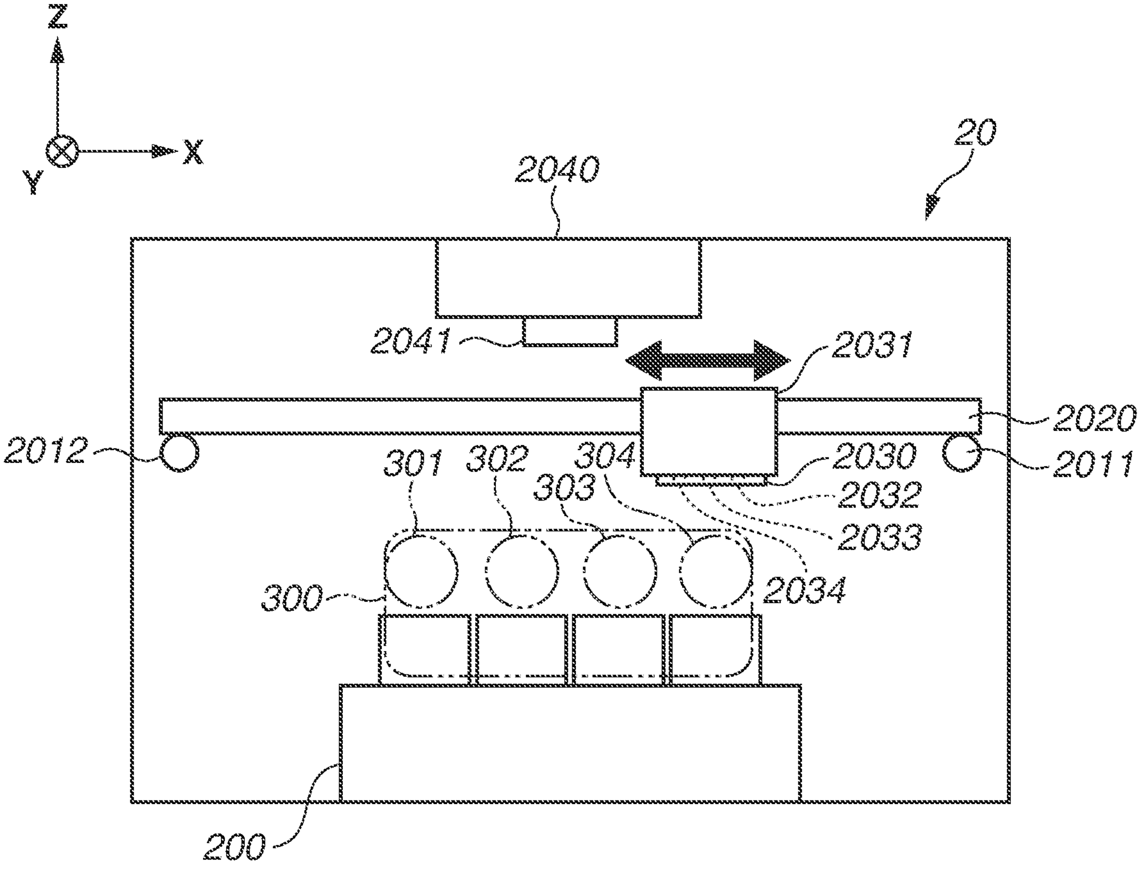
FIG. 2 is a front view schematically illustrating the configuration of the recording apparatus according to the first embodiment.
Figure 3:
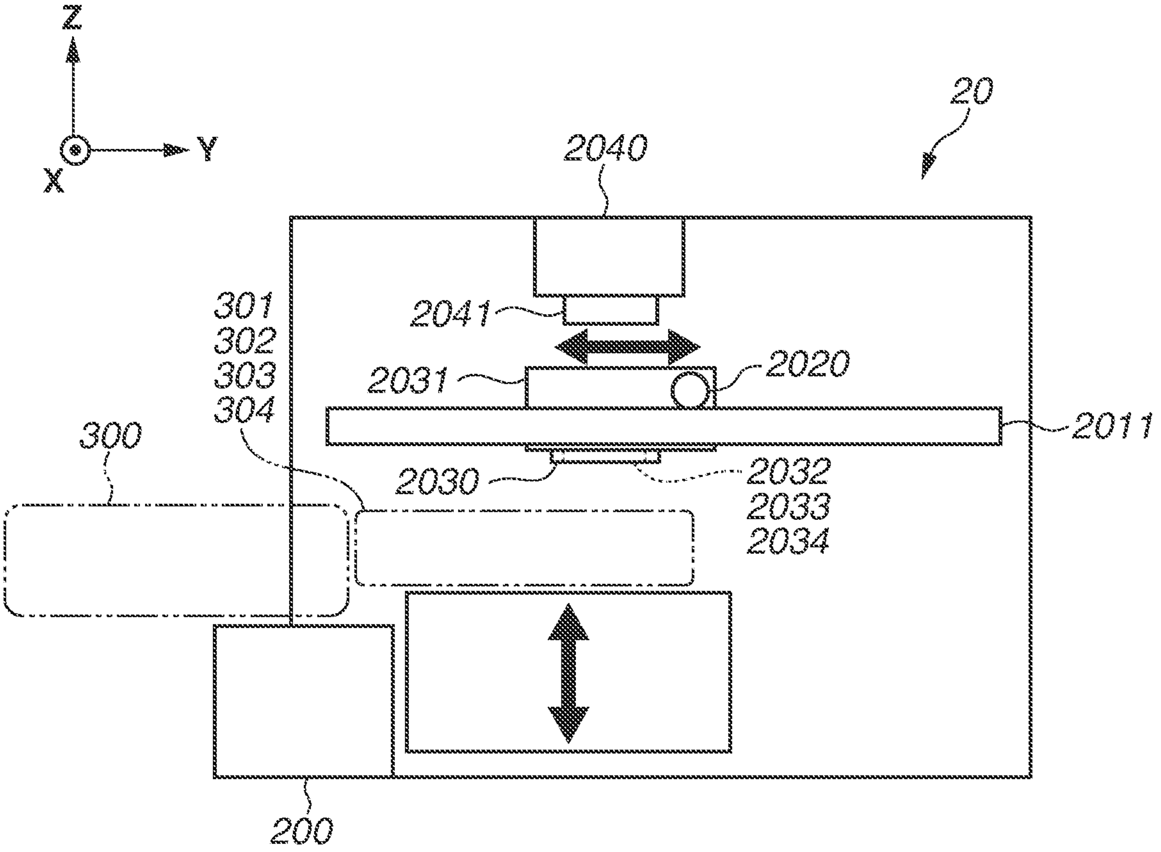
FIG. 3 is a right side view schematically illustrating the configuration of the recording apparatus according to the first embodiment.

FIG. 1 is a top view schematically illustrating a configuration of a nail recording apparatus 20. FIG. 2 is a front view schematically illustrating the configuration of the nail recording apparatus 20 (hereinafter, referred to as a recording apparatus 20). FIG. 3 is a right side view schematically illustrating the configuration of the recording apparatus 20. FIGS. 1, 2, and 3 illustrate an example of the recording apparatus 20 with a housing (not illustrated) removed. In FIGS. 1, 2, and 3, assume that +Y direction is a frontward direction, −Y direction is a backward direction (rearward), +X direction is a rightward direction, −X direction is a leftward direction, +Z direction is a downward direction, and −Z direction is an upward direction. A Z-axis corresponds to the direction of gravity.

The recording apparatus 20 is configured to record a nail design by discharging ink (liquid) to a nail serving as a recording medium using an ink-jet method. The finger of a recording target nail is referred to as a print target finger. The recording apparatus 20 includes a recording unit 203 for performing recording on the nail, and a hand placement unit 200 capable of relatively moving the nail in the Z direction with respect to the recording unit 203. More specifically, the hand placement unit 200 is configured to be elevatable in a state where the print target finger is placed thereon. Further, the recording apparatus 20 includes an image capturing unit 204 configured to capture an image of the print target finger from above and recognize the position of the nail in the XY directions. Operations of the whole recording apparatus 20 is controlled by a control unit 40 (see FIG. 4).

In addition, the recording medium may be another medium that is attachable to and detachable from the user, such as a nail chip and a nail seal, other than the nail. In a case where printing is performed on a recording medium attachable to and detachable from the user, the printing needs not to be performed on the recording medium without being attached on the user's finger, and the printing may be performed on, for example, the nail chip or nail seal without being attached on the finger.

<Recording Unit>

The recording unit 203 includes a carriage 2031 on which a recording head 2030 is mounted.

The recording head 2030 includes the following ink discharge nozzles.

Cyan ink discharge nozzle 2032

Magenta ink discharge nozzle 2033

Yellow ink discharge nozzle 2034

The recording head 2030 discharges ink supplied from ink tanks (not illustrated) attached to the carriage 2031 using the above-described ink discharge nozzles.

The carriage 2031 and the recording head 2030 mounted on the carriage 2031 are provided to be relatively movable with respect to the hand placement unit 200 (described in detail below) at least in the XY directions. The details thereof will now be described. The recording apparatus 20 includes Y direction rail guides 2011 and 2012, and an X direction rail guide 2020. The Y direction rail guides 2011 and 2012 extend in the Y direction to be used to move the carriage 2031 forward and backward. The X direction rail guide 2020 extends to the X direction intersecting (orthogonal in the present embodiment) with the Y direction, and is used to move the carriage 2031 in rightward and leftward directions. The carriage 2031 and the recording head 2030 can move in the XY directions along the Y direction rail guides 2011 and 2012, and the X direction rail guide 2020, using two motors (not illustrated).

When recording is performed, the recording unit 203 performs recording operation of recording an image corresponding to one scan by discharging ink on the nail serving as a recording medium while moving the recording head 2030 in the X direction. After performing the moving operation for moving the recording head 2030 for a predetermined amount in the Y direction, the recording unit 203 performs the recording operation again. In this way, the recording apparatus 20 records an image on the nail by alternately repeating the recording operation and the moving operation. As described above, the recording apparatus 20 performs recording operation on the nail by moving the recording unit 203 in the XY directions with respect to the recording medium, without moving the nail serving as a recording medium (recording target) during the recording.

<Image Capturing Unit>

The image capturing unit 204 includes a camera 2040 mounted on inside the roof portion of the recording apparatus 20 to capture an image of a finger. At the lower part of the camera 2040, an imaging lens 2041 is provided. The image capturing unit 204 may be fixedly mounted on the recording apparatus 20, or, for example, a smart phone including a camera function may be mounted by a user. By the image capturing unit 204 performing an image capturing in a state where the hand is placed on the hand placement unit 200, a rough position of the nail serving as a recording medium can be specified.

<Hand Placement Unit>

The hand placement unit 200 includes a hand placing portion 205 arranged on the bottom surface side (downside) of the recording apparatus 20 to place a palm. The hand placement unit 200 can be pulled out from the recording apparatus 20 toward the front side (+Y direction side), and pulled into inside the recording apparatus 20 (−Y direction side) from the pulled out state. The user pulls out the hand placement unit 200 from the recording apparatus 20 toward the front side (+Y direction side), and places the user's hand on the pulled out hand placement unit 200. The user then pushes the hand placement unit 200 into inside the recording apparatus 20 while the print target finger is placed on the hand placement unit 200. In this way, the nail portion serving as a recording medium can be positioned in a recording region where the recording unit 203 can record.

<Control Unit>

Figure 4:
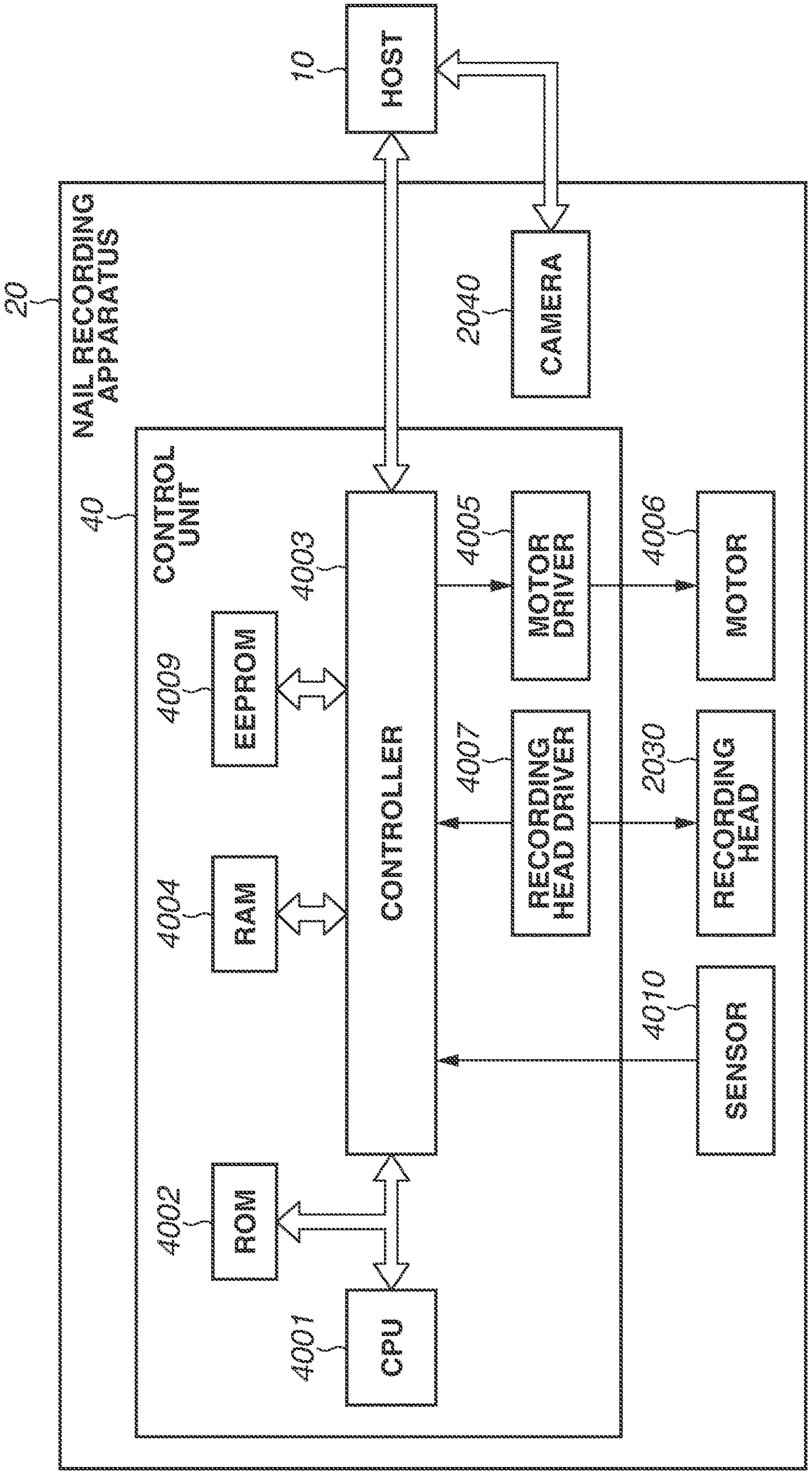
FIG. 4 is a block diagram schematically illustrating a hardware configuration of the recording apparatus according to the first embodiment.

FIG. 4 is a block diagram schematically illustrating a hardware configuration of the recording apparatus 20. As illustrated in FIG. 4, the recording apparatus 20 includes the control unit 40, the recording head 2030, the camera 2040, a motor 4006, and a sensor 4010. The recording apparatus 20 is also configured to communicate with a host 10, such as a computer, a smart phone, and a tablet terminal.

The control unit 40 includes a central processing unit (CPU) 4001, a read only memory (ROM) 4002, a controller 4003, a random access memory (RAM) 4004, a motor driver 4005, a recording head driver 4007, and an electrically erasable programmable read only memory (EEPROM) 4009.

The CPU 4001 serving as control means controls each mechanism in the recording apparatus 20 according to various kinds of programs stored in the ROM 4002 via the controller 4003. The ROM 4002 stores various kinds of programs. The RAM 4004 is used as a work area for temporarily storing various kinds of data or performing various kinds of processing. The CPU 4001 performs image processing of converting image data received from the host 10 into a recording signal recordable by the recording apparatus 20. The CPU 4001 then drives the motor 4006 via the motor driver 4005 and records the image on the recording medium by driving the recording head 2030 via the recording head driver 4007, based on information obtained through the image processing. In FIG. 4, to facilitate understanding, various kinds of motors in the recording apparatus 20 are represented as the motor 4006, and motor drivers for driving the various kinds of motors are represented as the motor driver 4005.

Further, the control unit 40 includes the EEPROM 4009 that is electrically writable. The EEPROM 4009 stores various kinds of setting values or data to be updated. The data stored in the EEPROM 4009 is used by the controller 4003 or the CPU 4001 as control parameters. In FIG. 4, to facilitate understanding, various kinds of sensors, such as an encoder sensor, provided in the recording apparatus 20 are represented as the sensor 4010. The CPU 4001, for example, increments count information obtained by counting slits with the encoder sensor, in a ring buffer in the RAM 4004 as needed. The CPU 4001 performs various kinds of controls, based on the information obtained by the sensor 4010.

The camera 2040 is connected to the host 10. The host 10 performs image processing regarding the positional information about the nail, based on the image information obtained by the camera 2040. The CPU 4001 performs various kinds of controls, based on the positional information about the nail obtained from the host 10.

Incidentally, FIG. 4 schematically illustrates the configuration, and other components may be included. In FIG. 4, the example in which the recording apparatus 20 and the host 10 are separately provided is illustrated, but the host 10 may be built in the recording apparatus 20.

Figure 5:
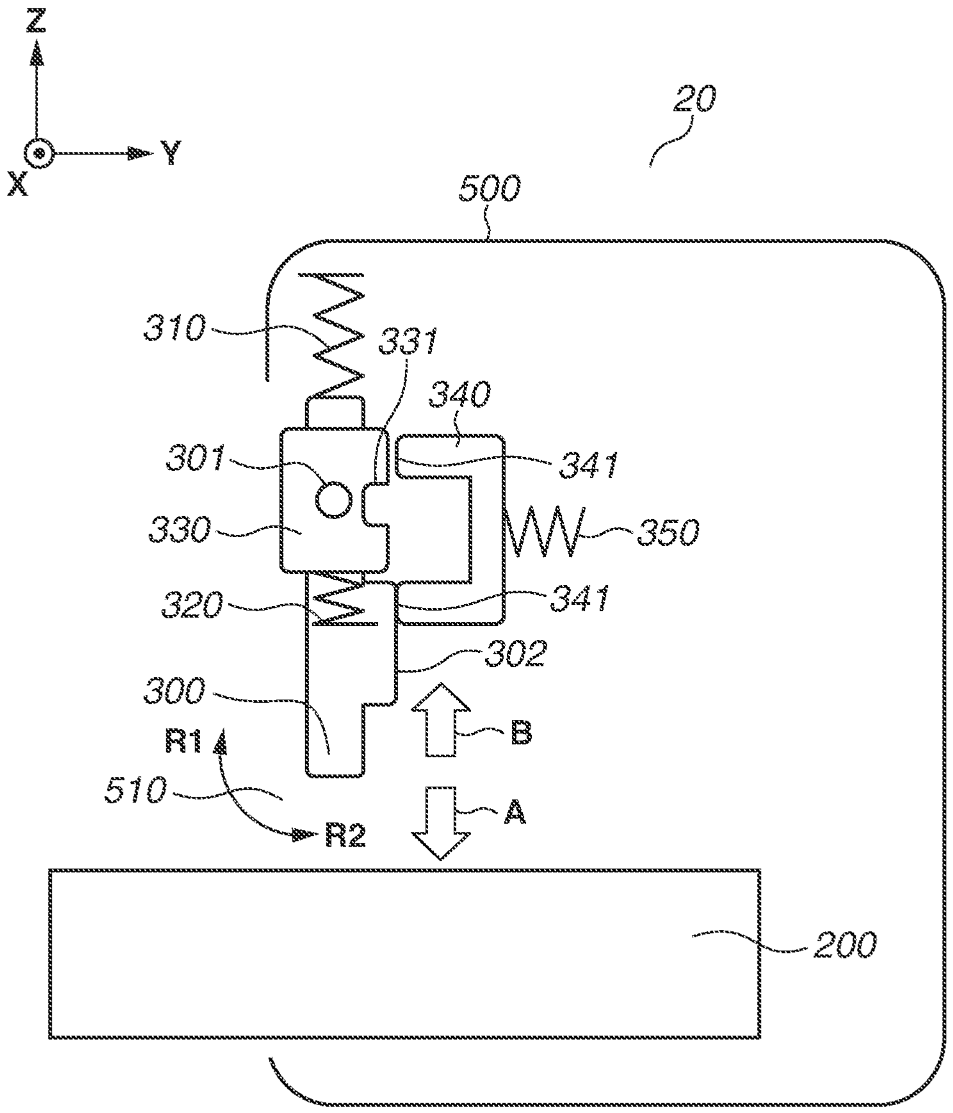
FIG. 5 is a YZ cross-section diagram illustrating a finger constraint mechanism of the recording apparatus according to the first embodiment.

FIG. 5 is a YZ cross-section diagram of the finger constraint mechanism of the recording apparatus 20. The recording apparatus 20 according to the present embodiment includes a box-shaped housing 500. On the front side of the housing 500 (left side in FIG. 3), an opening 510 is provided for allowing a hand (recording medium H) including a plurality of fingers F with nails N to be inserted therein. The user inserts, when printing is performed on the nails N of a recording medium H, the recording medium H placed on the hand placement unit 200 inside the recording apparatus 20 through the opening 510.

The width (length in X direction) of the opening 510 is a width that can sufficiently insert the recording medium H. In this case, the width of the opening 510 may be a width enough to insert all the fingers F or one of the fingers F from among the plurality of fingers F included in the recording medium H. Alternatively, the width of the opening 510 may be a width enough to insert the print target fingers F selected from the plurality of fingers F included in the recording medium H. The opening 510 may be used not only for inserting the recording medium H into the recording apparatus 20, but also for performing maintenance work of the recording apparatus 20, such as replacing the recording unit 203, as a work opening.

The recording apparatus 20 includes a hand pressing member 300 to press the recording medium H with respect to the hand placement unit 200 as a pressing member. The state illustrated in FIG. 5 is a state where the recording medium H is not inserted inside the recording apparatus 20, and at this time, the hand pressing member 300 is located at a position (closed position) at which the hand pressing member 300 covers at least a part of the opening 510. The hand pressing member 300 is provided with a rotation shaft 301, and supported to be rotatable around the rotation shaft 301 in an R1 direction and an R2 direction. The hand pressing member 300 is configured not to be rotatable in the R2 direction from the closed position, while the hand pressing member 300 is configured to be rotatable in the R1 direction from the closed position. In other words, the hand pressing member 300 is configured not to be rotatable to the inner side of the recording apparatus 20 exceeding the closed position. The hand pressing member 300 is urged by an urging member 310 in an A direction (downward in Z direction).

The hand pressing member 300 is supported by a slide member 330 serving as a movement member, and is urged by the urging member 310 in a B direction (upward in Z direction). The slide member 330 is a member slidable in the A direction and the B direction opposite to the A direction, and when the slide member 330 slides, the hand pressing member 300 also slides in conjunction with the slide member 330. In the present embodiment, as will be described below in detail, the A direction is a direction in which the hand pressing member 300 presses the recording medium H placed on the hand placement unit 200, and the B direction is a direction in which the hand pressing member 300 releases the pressing force urged to the recording medium H.

The rotation shaft 301 may be integrally configured with the hand pressing member 300 or the slide member 330 as a unit, or may be separately configured as an individual member. In this case, a bearing portion may be provided on the hand pressing member 300 or the slide member 330, and the rotation shaft 301 may be inserted therein to configure a shaft unit.

Since the hand pressing member 300 is supported by the slide member 330, the slide member 330 is urged by the urging member 310 via the hand pressing member 300 when the hand pressing member 300 is located at the closed position. In other words, the slide member 330 is urged by the urging member 310 in the A direction, and is urged by an urging member 320 in the B direction.

In the present embodiment, the urging force in the B direction urged by the urging member 320 is set to be smaller than the sum of the urging force of the urging member 310 and the own weights of the hand pressing member 300, the rotation shaft 301, and the slide member 330. In a state where the hand pressing member 300 is at the closed position, the hand pressing member 300 receives the urging force in the A direction to slide in the A direction, accordingly. The urging member 310 and the urging member 320 are each configured of a coil spring or an elastically deformable and resilient material.

The recording apparatus 20 further includes a lock member 340 serving as a fixing member. The slide movement of the slide member 330 is restricted by the lock member 340 engaging with a groove 331 serving as an engaging portion provided in the slide member 330. The lock member 340 is urged by an urging member 350 in a direction toward the slide member 330. In the present embodiment, the urging direction of the urging member 350 is leftward in the Y direction. However, any direction can also be set for the urging direction by changing the arranged position of the urging member 350 depending on the positional relationship between the slide member 330 and the lock member 340.

The hand pressing member 300 includes a surface 302 that can contact the lock member 340, and the surface 302 contacts the contact portion 341 of the lock member 340 in a state where the hand pressing member 300 is located at the closed position. At this time, the lock member 340 is restricted from moving leftward in the Y direction by the hand pressing member 300 so that the lock member 340 does not engage with the groove 331 of the slide member 330. Thus, the hand pressing member 300 is urged in the A direction in the state where the hand pressing member 300 is located at the closed position, as described above.

Figure 6A:
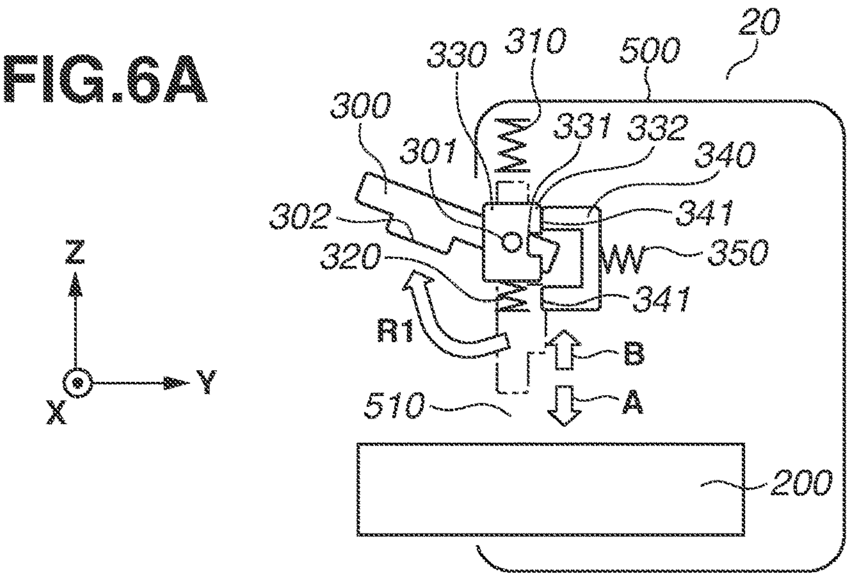
FIGS. 6A, 6B, and 6C are YZ cross-section diagrams each illustrating a state where a hand pressing member of the recording apparatus according to the first embodiment has moved to an open position.
Figure 6B:
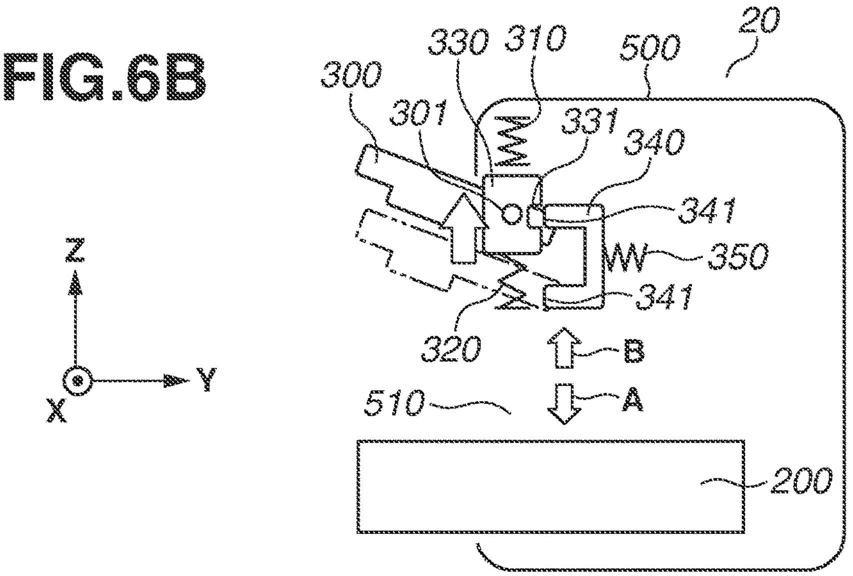
Figure 6C:
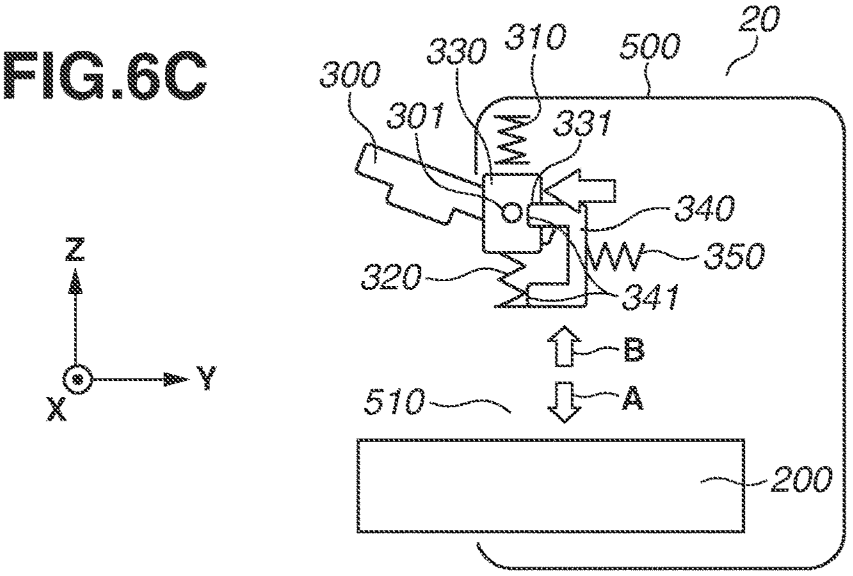

FIGS. 6A, 6B, and 6C are YZ cross-section diagrams of the recording apparatus 20 each illustrating a state where the hand pressing member 300 has move to an open position. A procedure will now be described in which the hand pressing member 300 moves to the open position and is locked by the lock member 340.

When the hand pressing member 300 rotates in the R1 direction to move to the open position illustrated in FIG. 6A, the opening 510 becomes an open state. At this time, the contact between the surface 302 of the hand pressing member 300 and the contact portion 341 of the lock member 340 is released, and a surface 332 and the contact portion 341 of the lock member 340 contact each other by the lock member 340 following the urging force applied by the urging member 350 leftward in the Y direction.

At this time, since the urging force applied by the urging member 310 to the hand pressing member 300 is released, the slide member 330 is in a state of not receiving the urging force in the A direction. At this time, the slide member 330 is urged by the urging member 320 in the B direction as described above. The urging force of the urging member 320 is set to be larger than the sum of the own weights of the hand pressing member 300, the rotation shaft 301, and the slide member 330. Thus, in a state where the urging force applied to the slide member 330 by the urging member 310 in the A direction is released, the slide member 330 slides in the B direction in the state of the surface 332 and the contact portion 341 in contact with each other, following the urging force applied by the urging member 320, as illustrated in FIG. 6B.

As the slide member 330 slides in the B direction, the slide member 330 reaches a position at which the groove 331 of the slide member 330 and the contact portion 341 of the lock member 340 face each other as illustrated in FIG. 6C. At this time, the lock member 340 is pushed into the groove 331 by the urging force applied by the urging member 350, and the groove 331 and the contact portion 341 are engaged with each other. In this way, the slide of the slide member 330 in the B direction is restricted to be in a locked state.

Figure 7A:
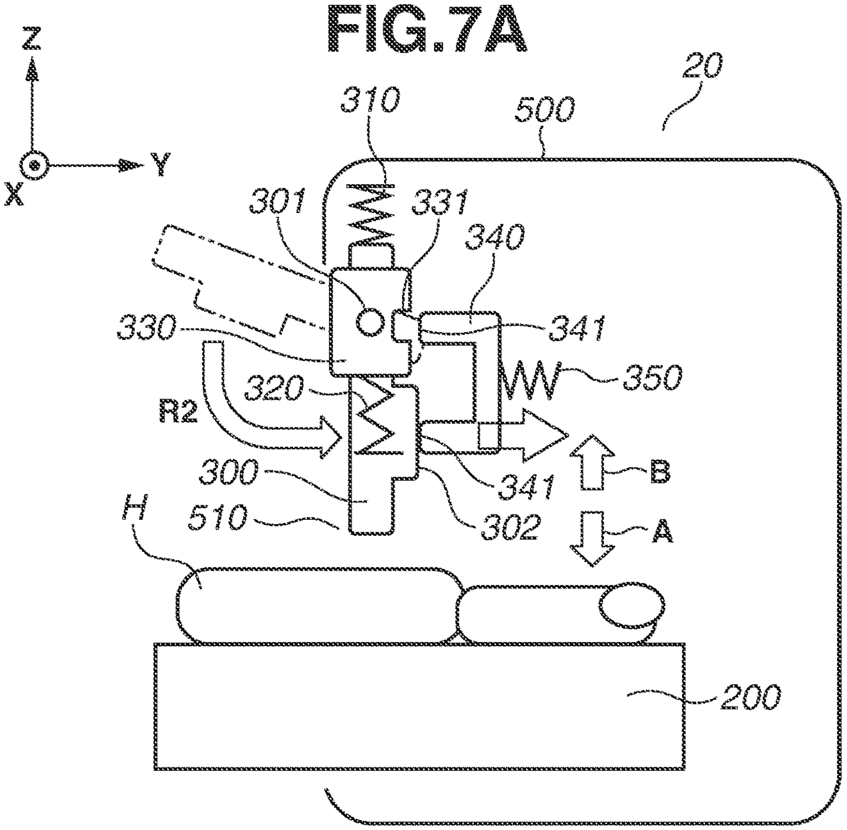
FIGS. 7A and 7B are YZ cross-section diagrams each illustrating a state where a recording medium inserted inside the recording apparatus according to the first embodiment is constrained by the hand pressing member.
Figure 7B:
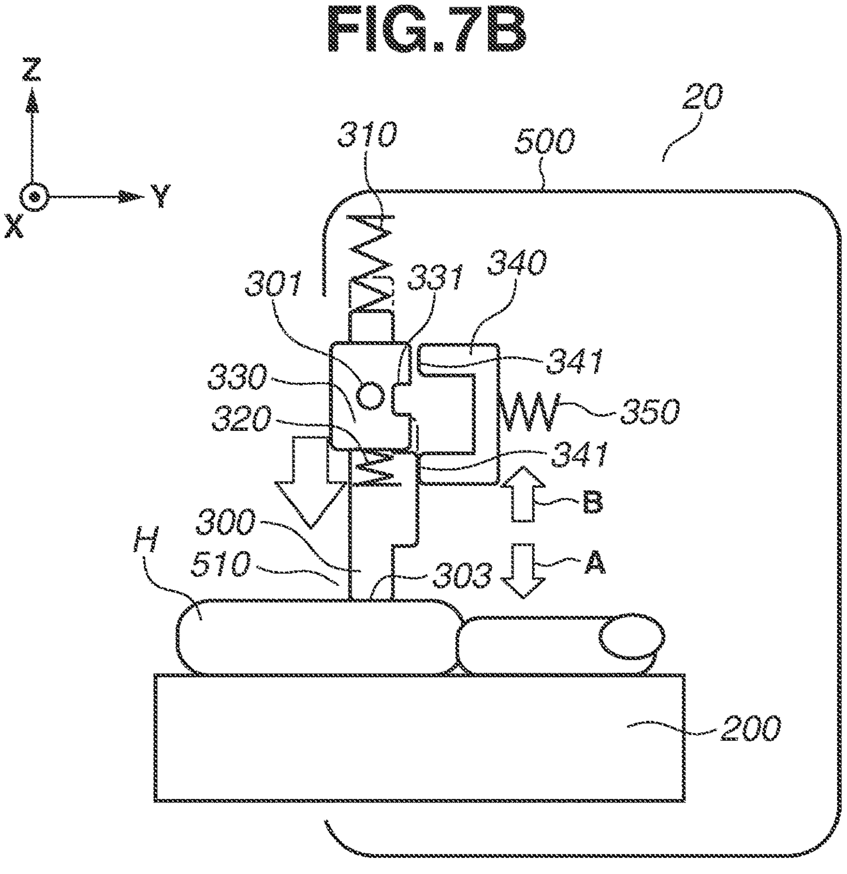

FIGS. 7A and 7B are YZ cross-section diagrams each illustrating a state where the recording medium H inserted inside the recording apparatus 20 is constrained by the hand pressing member 300. When the hand pressing member 300 and the slide member 330 are in the state illustrated in FIG. 6C, the recording medium H placed on the hand placement unit 200 is inserted inside the recording apparatus 20. In the present embodiment, the recording medium H is moved rightward in the Y direction in FIGS. 7A and 7B to be inserted inside the recording apparatus 20.

After the insertion of the recording medium H, the hand pressing member 300 is rotated in the R2 direction to move to the closed position. At this time, on the way of moving to the closed position by rotating the hand pressing member 300, the urging member 310 contacts the hand pressing member 300 again, and the hand pressing member 300 is urged in the A direction. However, the groove 331 and the contact portion 341 are engaged with each other, and the movement of the slide member 330 is restricted, until the surface 302 of the hand pressing member 300 abuts the contact portion 341 of the lock member 340, as described above. The slide member 330 therefore does not slide in the A direction.

When the hand pressing member 300 rotates to a position at which the surface 302 of the hand pressing member 300 and the contact portion 341 of the lock member 340 contact each other, the lock member 340 is pressed by the hand pressing member 300 rightward in the Y direction as illustrated in FIG. 7A. As the lock member 340 is pressed rightward in the Y direction, the engagement between the groove 331 of the slide member 330 and the contact portion 341 of the lock member 340 is released, and the restriction of the movement of the slide member 330 is also released. At this time, the slide member 330 receives the urging force by the urging member 310 in the A direction via the hand pressing member 300, and thereby the slide member 330 slides in the A direction to contact the recording medium H as illustrated in FIG. 7B. The hand pressing member 300 desirably has a size in which the hand pressing member 300 does not contact with the recording medium H through the process of rotating from the open position to the closed position as illustrated in FIG. 7A.

Since the urging force from the urging member 310 is still applied on the hand pressing member 300 contacting the recording medium H, the recording medium H is pressed by the hand pressing member 300 in the A direction. The movement of the recording medium H on the hand placement unit 200 is thereby restricted, and the recording medium H is restricted from moving during the printing operation of the recording apparatus 20. In contrast, since the slide member 330 is not locked by the lock member 340 in the state illustrated in FIG. 7B, the slide member 330 is movable also in the B direction. Thus, it is possible to restrict the movement of the various recording media H by using the hand pressing member 300.

In a case where the hand pressing member 300 is rotated from the open position to the closed position while the operation of the slide member 330 is not restricted, the slide member 330 is moved in the A direction by the urging force applied by the urging member 310 while the hand pressing member 300 is rotating. Thus, the front end position of the hand pressing member 300 is located lower than the front end position when the slide member 330 is locked by the lock member 340. In this case, the hand pressing member 300 and the recording medium H contact each other while the hand pressing member 300 is rotating, and the rotation of the hand pressing member 300 may be continued in this state. Thus, the surface of the recording medium H may be rubbed by the hand pressing member 300.

According to the configuration of the present embodiment, the slide member 330 is locked and the movement thereof is restricted when the hand pressing member 300 rotates from the open position to the closed position. The lowering of the front end position of the hand pressing member 300 can thereby be restricted, and the rubbing of the recording medium H by the hand pressing member 300 can also be restricted.

Figure 8A:
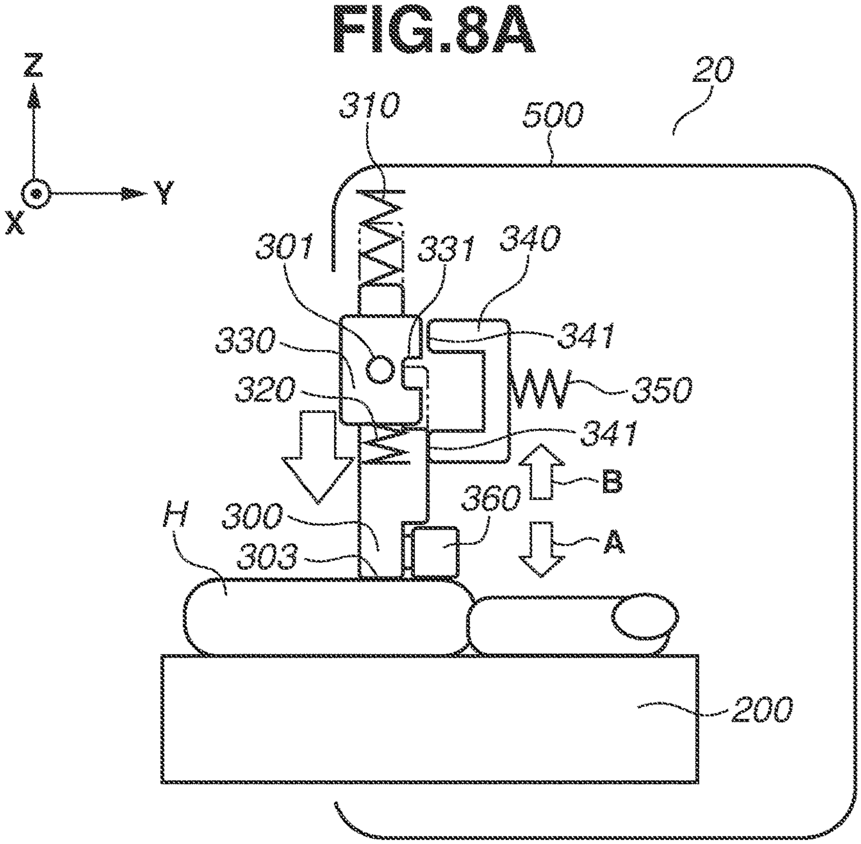
FIGS. 8A and 8B are YZ cross-section diagrams each illustrating a state where the recording medium pressed by the hand pressing member is pulled out from inside the recording apparatus according to the first embodiment.
Figure 8B:
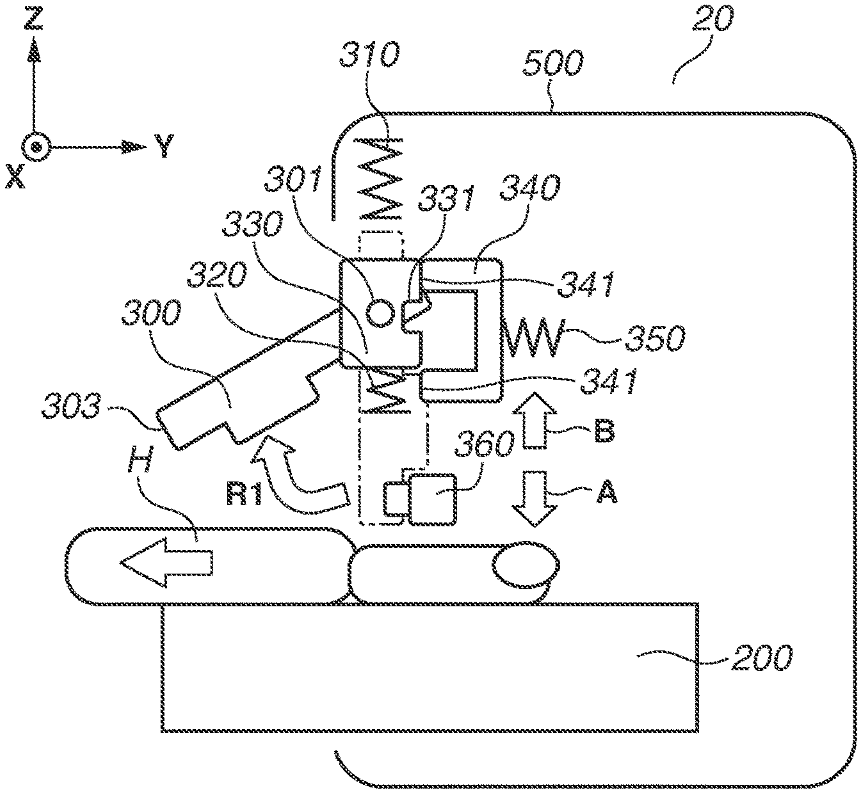

FIGS. 8A and 8B are YZ cross-section diagrams each illustrating a state where the recording medium H is pulled out from inside the recording apparatus 20 while the recording medium H is pressed by the hand pressing member 300. FIG. 8A illustrates a state where the urging force is applied from the hand pressing member 300 to the recording medium H, and the recording medium H is pressed by the hand pressing member 300. At this time, a contact surface 303 of the hand pressing member 300 and the recording medium H are in contact with each other. The hand pressing member 300 is provided with a posture detection unit 360, and it is possible to detect the posture of the hand pressing member 300. In a state illustrated in FIG. 8A, the posture detection unit 360 detects that the hand pressing member 300 is located at the closed position. The posture detection unit 360 may not be provided on the hand pressing member 300, and may be provided on the slide member 330, the hand placement unit 200, the housing 500, or any position in the recording apparatus 20. Further, a plurality of the posture detection units 360 may be provided.

FIG. 8B illustrates a state where the recording medium H is pulled out from inside the recording apparatus 20. When the user pulls out the recording medium H in the state illustrated in FIG. 8A, the contact surface 303 in contact with the recording medium H receives a force leftward in the Y direction from the recording medium H. With this force, the hand pressing member 300 is rotated in the R1 direction around the rotation shaft 301. When the hand pressing member 300 rotates in the R1 direction, the surface 302 and the contact portion 341 does not contact each other, and the urging force applied by the urging member 310 to the hand pressing member 300 are released. As a result, the slide member 330 moves in the B direction by the urging force applied by the urging member 320. In this way, the pressing force applied on the recording medium H by the hand pressing member 300 is released.

The operation of pulling out the recording medium H may be an operation of moving the recording medium H in a direction other than the direction of inserting the recording medium H into the recording apparatus 20, in addition to the operation of moving the recording medium H leftward in the Y direction. The pressing force applied from the hand pressing member 300 to the recording medium H may not be released by the rotation of the whole hand pressing member 300, and may be released by, for example, rotating a part of the hand pressing member 300. Further, the pressing force applied from the hand pressing member 300 to the recording medium H may be released by the hand pressing member 300 separating from the recording medium H in a folding-up manner around the rotation axis.

When the hand pressing member 300 rotates in the R1 direction when the recording medium H is pulled out, the posture detection unit 360 detects that the hand pressing member 300 has rotated. In a case where the recording medium H is pulled out during the printing operation of the recording apparatus 20, there is a possibility that the movable members, such as the recording unit 203, are operating, and the recording medium H may contact the moving members. To avoid such a contact, the movable members of the recording apparatus 20 can be stopped, based on the detection result of the posture detection unit 360.

Figure 9:
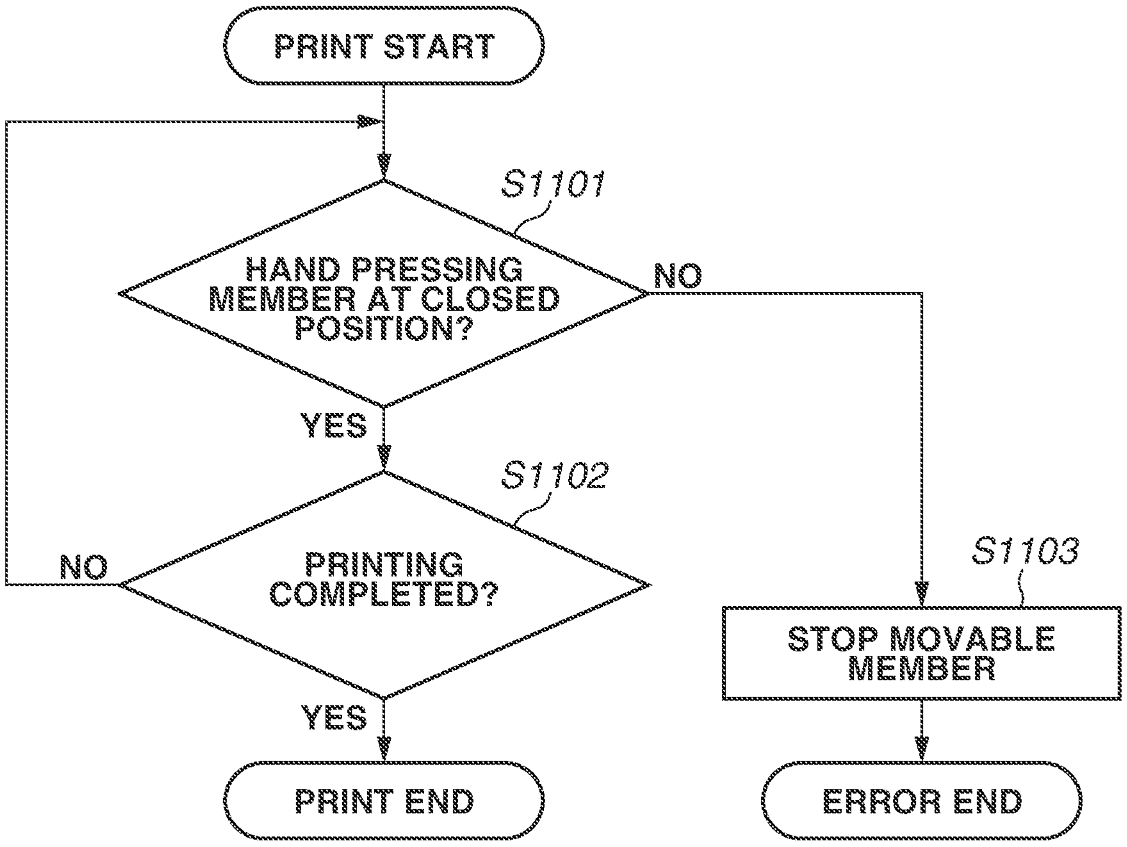
FIG. 9 is a control flowchart of a printing operation based on a detection result of a posture detection unit of the recording apparatus according to the first embodiment.

FIG. 9 is a control flowchart of the printing operation based on the detection result of the posture detection unit 360. When the printing operation of the recording apparatus 20 firstly starts, in step S1101, the posture detection unit 360 detects the posture of the hand pressing member 300, and the CPU 4001 determines whether the hand pressing member 300 is located at the closed position, based on the detection result. In a case where the CPU 4001 determines that the hand pressing member 300 is located at the closed position (YES in step S1101), the processing proceeds to step S1102. In step S1102, the CPU 4001 determines whether the printing is completed. In a case where the printing is not completed (NO in step S1102), the processing returns to step S1101, and the CPU 4001 continues the printing operation. In contrast, in a case where the CPU 4001 determines that the printing is completed (YES in step S1102), the CPU 4001 ends the printing.

In contrast, in a case where the CPU 4001 determines that the hand pressing member 300 is not located at the closed position (NO in step S1101), the processing proceeds to step S1103. In step S1103, the CPU 4001 stops the operations of the movable members, such as the recording unit 203, in the recording apparatus 20. After completing the processing in step S1103, the CPU 4001 provides an error notification to the user and ends the printing operation as an error end. At this time, the error notification may be provided by a notification unit included in the recording apparatus 20, or may be provided by an external host connected to the recording apparatus 20. Further, the notification may be performed using audio information or visual information, or other methods.

In this case, the CPU 4001 may control to power off the recording apparatus 20 in the case where the CPU 4001 determines that the hand pressing member 300 is not located at the closed position in step S1103.

In the above-described configuration, the posture detection unit 360 detects the posture change of the hand pressing member 300 in conjunction with the pulling out operation of the recording medium H, and the CPU 4001 stops the operations of the movable members. However, the pulling out operation of the recording medium H may be directly detected. For example, the hand placement unit 200 may be provided with an operation detection sensor or a position detection sensor, and the CPU 4001 may stop the movable members by detecting the operation with the above-described sensor or may power off the recording apparatus 20 in a case where the operation of pulling out the recording medium H from inside the recording apparatus 20 is performed.

Alternatively, the CPU 4001 may perform processing of power off of the recording apparatus 20 after completing the processing in step S1101. For example, the CPU 4001 may power off the whole apparatus main body after stopping the movable members in step S1103, or immediately after determining that the hand pressing member 300 is not located at the closed position in step S1101. Further, the posture detection unit 360 may not be included in the recording apparatus 20 in a case where the CPU 4001 does not stop the movable members along with the pulling out operation of the recording medium H.

As described above, the urging force to the recording medium H is released by the hand pressing member 300 rotating from the closed position in the R1 direction along with the operation of pulling out the recording medium H from inside the recording apparatus 20. The user can therefore pull out the recording medium H from the recording apparatus 20 smoothly. Further, the recording medium H can be pulled out from inside the recording apparatus 20 without contacting the operating members by detecting the position of the hand pressing member 300 rotated along with the pulling out operation of the recording medium H and stopping the movable members inside the recording apparatus 20.

According to the present disclosure, a recording medium can be pulled out from a recording apparatus smoothly.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2021-193682, filed Nov. 29, 2021, which is hereby incorporated by reference herein in its entirety.

What is claimed is:

1. A recording apparatus comprising:

a recording unit configured to perform recording on a recording medium placed at a first position;

a placement unit configured to place the recording medium on the placement unit; and a pressing member configured to apply a pressing force to the recording medium placed on the placement unit toward the placement unit in a case where the recording medium is at the first position, and to release the pressing force in a case where the recording medium moves from the first position, wherein the pressing member is rotatable around a rotation shaft between a first posture in which the pressing member applies the pressing force to the recording medium toward the placement unit, and a second posture in which the pressing member does not apply the pressing force to the recording medium toward the placement unit.

2. The recording apparatus according to claim 1, further comprising an opening through which the recording medium is inserted into the recording apparatus, wherein in a case where the recording medium moves from the first position in a direction toward the opening, the pressing member releases the pressing force.

3. The recording apparatus according to claim 1, wherein the pressing member and the recording medium contact each other in a case where the pressing member is in the first posture.

4. The recording apparatus according to claim 1, further comprising:

a detection unit configured to detect a movement of the recording medium; and a control unit configured to stop an operation of the recording apparatus in a case where the detection unit detects the movement of the recording medium from the first position.

5. The recording apparatus according to claim 4, further comprising a notification unit configured to provide an error notification to a user in a case where the detection unit detects the movement.

6. The recording apparatus according to claim 4, wherein the control unit powers off the recording apparatus in the case where the detection unit detects the movement.

7. The recording apparatus according to claim 1, wherein the recording medium has a first area on which recording is performed by the recording unit and a second area on which recording is not performed by the recording unit.

8. The recording apparatus according to claim 7, wherein in a case where the first area is at the first position, the pressing member applies the pressing force to the second area.

9. The recording apparatus according to claim 8, wherein in a case where the first area moves from the first position, the pressing member releases the pressing force applied to the second area.

10. The recording apparatus according to claim 8, further comprising an opening through which the recording medium is inserted into the recording apparatus, wherein in a case where the first area moves from the first position in a direction toward the opening, the pressing member releases the pressing force applied to the second area.

11. The recording apparatus according to claim 8, wherein the pressing member does not apply the pressing force to the first area.

12. The recording apparatus according to claim 8, wherein the pressing member does not contact the first area.

13. The recording apparatus according to claim 1, wherein the recording unit is a recording head configured to perform recording by discharging ink to the recording medium.

* * * * *